United States Patent
Mino (10) Patent No.: US 8,625,721 B2
(45) Date of Patent: Jan. 7, 2014

(54) BROADCAST RECEIVING APPARATUS AND BROADCAST RECEIVING METHOD

(75) Inventor: Osamu Mino, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 325 days.

(21) Appl. No.: 13/053,873

(22) Filed: Mar. 22, 2011

(65) Prior Publication Data

US 2011/0305301 A1    Dec. 15, 2011

(30) Foreign Application Priority Data

Jun. 15, 2010 (JP) ................................. 2010-136603

(51) Int. Cl.
*H04L 25/06* (2006.01)
(52) U.S. Cl.
USPC ........................................ 375/317; 455/553.1
(58) Field of Classification Search
USPC .......... 375/317, 345; 455/553.1, 552.1, 226.1
See application file for complete search history.

(56) References Cited

U.S. PATENT DOCUMENTS

2010/0233988 A1* 9/2010 Kon et al. ..................... 455/326

FOREIGN PATENT DOCUMENTS

| CN | 101841379 A | 9/2010 |
|---|---|---|
| JP | A-2004-15612 | 1/2004 |
| JP | B2-4101719 | 6/2008 |
| JP | B2-4264047 | 5/2009 |
| JP | A-2010-219649 | 9/2010 |

OTHER PUBLICATIONS

Aug. 9, 2013 Office Action issued in Chinese Patent Application No. 201110076617.8 (with translation).

* cited by examiner

*Primary Examiner* — Kevin Kim
(74) *Attorney, Agent, or Firm* — Oliff & Berridge, PLC (57) ABSTRACT

A broadcast receiving apparatus receives digital broadcast and analog broadcast including same broadcast contents simultaneously, and outputs the analog broadcast while the reception state of the digital broadcast worsens, thereby reduces uncomfortable auditory sensations caused by output switching from one type of broadcast to another type of broadcast. The broadcast receiving apparatus is configured to perform control to bring the acoustic characteristic of pre-switching broadcast closer to the acoustic characteristic of post-switching broadcast based on received field strength of analog broadcast signals when the output is switched from one broadcast to another broadcast.

10 Claims, 7 Drawing Sheets

BROADCAST RECEIVING APPARATUS AND BROADCAST RECEIVING METHOD

CROSS-REFERENCE TO RELATED APPLICATIONS

This application is based upon and claims the benefit of priority of the prior Japanese Patent Application No. 2010-136603, filed on Jun. 15, 2010, the entire contents of which are incorporated herein by reference.

BACKGROUND OF THE INVENTION

1. Field of the Invention

The present invention relates to a broadcast receiving apparatus and broadcast receiving method for receiving digital broadcast and analog broadcast simultaneously, and particularly to a broadcast receiving apparatus and broadcast receiving method that can reduce uncomfortable auditory sensations caused by switching the output between the digital broadcast and the analog broadcast.

2. Description of the Related Art

Conventionally, technique of In Band On Channel (IBOC) has been known. IBOC is one type of audio broadcasting, according to which the frequency band used in FM broadcast and AM broadcast is employed to broadcast the same contents by both digital broadcasting and analog broadcasting simultaneously.

Digital broadcast signals used in digital broadcasting realize reproduction of contents in wider sound range than that realized by analog broadcast signals used in analog broadcasting. However, when using the digital broadcast signals, if the received field strength becomes lower than a predetermined level, the contents cannot be reproduced properly.

On the other hand, analog broadcast signals cannot realize reproduction of contents in as wide sound range as possible by the digital broadcast signals. However, the analog broadcast signals can reproduce broadcast programs even when the received field strength is as low as to inhibit the reproduction of contents by digital broadcast signals.

According to the IBOC, even when the contents cannot be reproduced by digital broadcast signals, it is still possible to reproduce the contents using the analog broadcast signals. A broadcast receiving apparatus, which receives the audio broadcast provided through the IBOC, switches the output from the digital broadcast to the analog broadcast if the reception status of the digital broadcast worsens during the output of the digital broadcast, and switches the output back to the digital broadcast when the reception status of the digital broadcast recovers.

However, the broadcast receiving apparatus which receives the audio broadcast provided through the IBOC sometimes causes an uncomfortable auditory sensation to the user when the output is switched from digital broadcast to analog broadcast or vice versa, because of the difference in sound range of the analog broadcast and the digital broadcast.

To lessen such uncomfortable auditory sensations, various broadcast receiving apparatuses are proposed. For example, Japanese Patent No. 4101719 (hereinafter referred to as "first document") describes a broadcast receiving apparatus which, on determining that the reception status of the output of the digital broadcast is worsening and the output is going to be switched to the analog broadcast very soon, makes the acoustic characteristic of the digital broadcast gradually come close to the acoustic characteristic of the analog broadcast while the digital broadcast is being output.

More specifically, the broadcast receiving apparatus according to the first document determines that the output will be switched from the digital broadcast to the analog broadcast soon when the received field strength of the digital broadcast signal lowers to such a level that the reception status of the digital broadcast worsens.

Thus, the broadcast receiving apparatus of the first document reduces uncomfortable auditory sensations caused by switching the output from the digital broadcast to the analog broadcast by bringing the acoustic characteristic of digital broadcast close to the acoustic characteristic of analog broadcast before switching the output from digital broadcast to analog broadcast.

The broadcast receiving apparatus of the first document, however, cannot spare sufficient time for changing the acoustic characteristic. Hence, the uncomfortable auditory sensations caused by the output switching from one of digital broadcast and analog broadcast to the other cannot be reduced sufficiently.

More specifically, it is known that the reception status of digital broadcast suddenly worsens when the C/N ratio (Carrier to Noise ratio) of the received digital broadcast signal goes down below a predetermined C/N ratio, rather than linearly worsens along with the changes in received field strength of the digital broadcast signal.

Therefore, the broadcast receiving apparatus of the first document needs to bring the acoustic characteristic of digital broadcast close to the acoustic characteristic of analog broadcast rapidly within a very short time period after the reception status of digital broadcast starts worsening before the output is switched to analog broadcast.

The broadcast receiving apparatus of the first document is thus unable to reduce the uncomfortable auditory sensation caused by the output switching from digital broadcast to analog broadcast sufficiently.

Such problem also occurs when the output is switched from analog broadcast to digital broadcast. Therefore, the broadcast receiving apparatus of the first document may not be able to reduce the uncomfortable auditory sensations to a sufficient level when the output is switched from analog broadcast to digital broadcast.

In view of the foregoing, an issue now is how to realize the broadcast receiving apparatus and broadcast receiving method that would allow further reduction in uncomfortable auditory sensations that are caused by the output switching between digital broadcast and analog broadcast.

The present invention is made to solve the problems in the conventional technologies as described above, and an object of the present invention is to provide a broadcast receiving apparatus and a broadcast receiving method that allow further reduction in uncomfortable auditory sensations caused when the output is switched between digital broadcast and analog broadcast.

SUMMARY OF THE INVENTION

It is an object of the present invention to at least partially solve the problems in the conventional technology.

According to one aspect of the present invention, a broadcast receiving apparatus includes a receiving unit that receives digital broadcast and analog broadcast including same broadcast contents simultaneously, an output switching unit that outputs the digital broadcast received by the receiving unit and outputs the analog broadcast during a time period over which a reception status of the digital broadcast worsens, a detecting unit that detects a received field strength of analog broadcast signals employed in the analog broadcast, and an acoustic controlling unit that performs control to bring an acoustic characteristic of a pre-switching broadcast closer to an acoustic characteristic of a post-switching broadcast based on the received field strength detected by the detecting unit when an output is switched between the digital broadcast and the analog broadcast.

According to another aspect of the present invention, a broadcast receiving method includes receiving digital broadcast and analog broadcast including same broadcast contents simultaneously, outputting the digital broadcast received in the receiving and outputting the analog broadcast during a time period over which a reception status of the digital broadcast worsens, detecting a received field strength of analog broadcast signals employed in the analog broadcast, and performing a control to bring an acoustic characteristic of a pre-switching broadcast closer to an acoustic characteristic of a post-switching broadcast based on the received field strength detected in the detecting when an output is switched between the digital broadcast and the analog broadcast.

The above and other objects, features, advantages and technical and industrial significance of this invention will be better understood by reading the following detailed description of presently preferred embodiments of the invention, when considered in connection with the accompanying drawings.

DETAILED DESCRIPTIONS

Exemplary embodiments of a broadcast receiving apparatus and a broadcast receiving method according to the present invention will be described in detail below with reference to the accompanying drawings. Firstly, before explaining the details of the embodiments, the overview of the broadcast reception technique according to the present invention will be described in comparison with the conventional broadcast reception technique.

In the reception technique described below; digital broadcast and analog broadcast of the same contents broadcast according to IBOC (In Band On Channel) are received simultaneously; the digital broadcast is output; and the analog broadcast is output during a period in which the reception status of the digital broadcast worsens.

Figure 1:
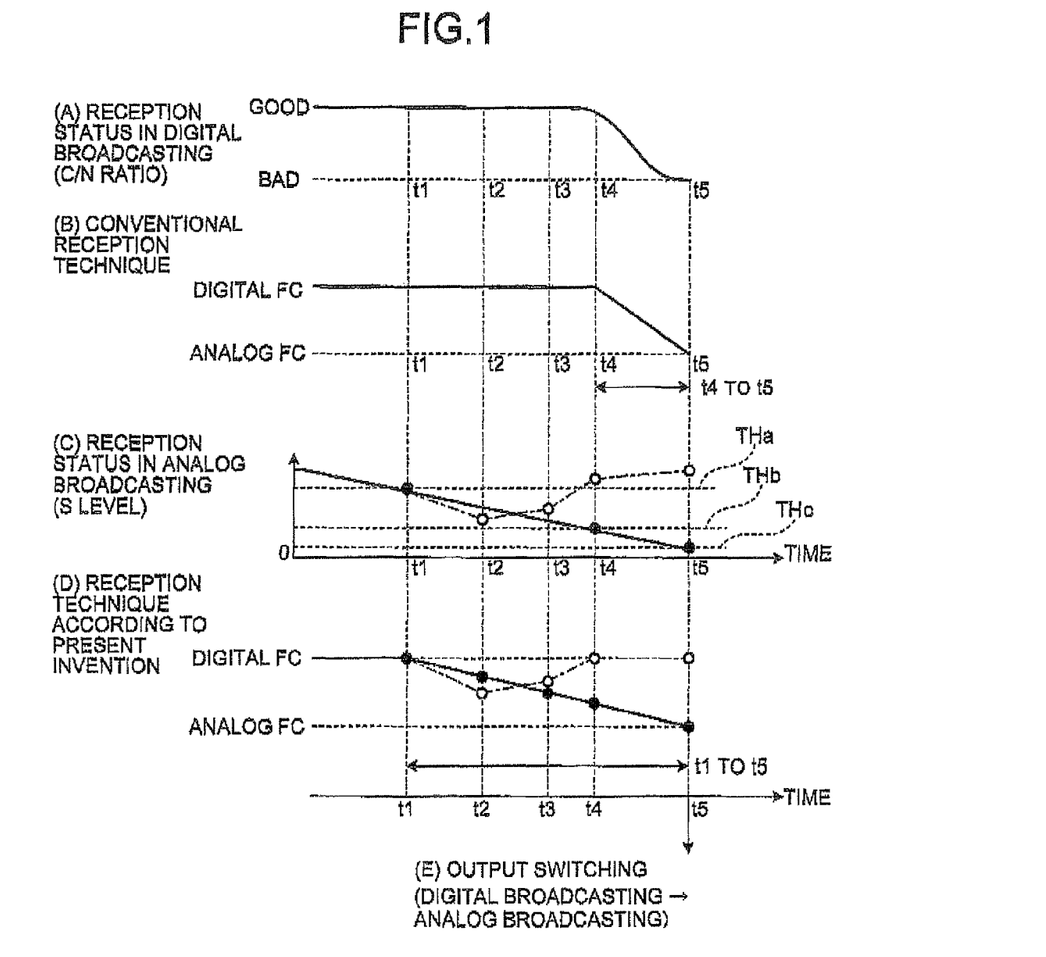
FIG. 1 is a diagram illustrating an overview of a broadcast reception technique according to the present invention and a conventional broadcast reception technique.

FIG. 1 is a diagram illustrating an overview of a broadcast reception technique according to the present invention and a conventional broadcast reception technique. In the example of FIG. 1, the reception status of the digital broadcast (i.e., C/N ratio (Carrier to Noise ratio) of digital broadcast signal) starts to worsen at time t4 while the digital broadcast is being output, and the output is switched from digital broadcast to analog broadcast at time t5 as illustrated in (A) of FIG. 1.

In such case, according to the conventional broadcast reception technique, as illustrated in (B) of FIG. 1, a process starts at time t4 to lower the frequency characteristic of digital broadcast signal (hereinafter referred to as "digital FC") which shows the acoustic characteristic of digital broadcast being output at time t4.

According to the conventional broadcast reception technique, the digital FC is lowered during time t4 to time t5 to the level of the frequency characteristic of analog broadcast signal (hereinafter referred to as "analog FC") which shows the acoustic characteristic of analog broadcast, and then the output is switched to analog broadcast.

Thus, according to the conventional broadcast reception technique, the uncomfortable auditory sensations at the output switching to the analog broadcast is reduced by lowering the digital FC to the level of analog FC after the reception status of digital broadcast starts to worsen and before the output is switched to analog broadcast.

The reception status of the digital broadcast starts to worsen when the C/N ratio of the digital broadcast signal becomes equal to or less than a predetermined C/N ratio. Thereafter the reception status worsens drastically within a very short period of time. Hence, when the conventional broadcast reception technique is employed, the digital FC has to be lowered to the level of analog FC within a very short period of time, i.e., from time t4 to time t5.

Thus, the conventional broadcast reception technique cannot spare a sufficient time for lowering the digital FC to the level of the analog FC. Hence, it is not possible to sufficiently reduce the uncomfortable auditory sensation which is caused when the output is switched to the analog broadcast.

According to the broadcast reception technique of the present invention, a process to bring the digital FC close to the level of analog FC starts earlier than was performed in the conventional broadcast reception technique, to further reduce the uncomfortable auditory sensations caused at the switching to the analog broadcast.

Specifically, according to the broadcast reception technique of the present invention, a received field strength (hereinafter referred to as "S level") of the analog broadcast signal which indicates the reception status of the analog broadcast is monitored while the digital broadcast is being output. The S level starts to decrease before the time t4 at which the reception status of the digital broadcast starts to worsen as illustrated in (C) of FIG. 1.

Hence, according to the broadcast reception technique of the present invention, it is determined that the reception status of the digital broadcast will worsen soon when the S level becomes equal to or lower than a starting threshold THa of a predetermined level at time t1, and starts a process to lower digital FC at time t1 as illustrated in (D) of FIG. 1.

Subsequently, according to the broadcast reception technique of the present invention, the digital FC is made gradually close to the analog FC within the time period from t1 to t5. At time t5, the output is switched from the digital broadcast to the analog broadcast as illustrated in (E) of FIG. 1.

As is clear from the above, according to the broadcast reception technique of the present invention, the digital FC can be brought closer to the analog FC over a long time period of t1 to t5, which is longer than the period used in the conventional broadcast reception technique. Therefore, according to the broadcast reception technique of the present invention, the uncomfortable auditory sensations caused when the output is switched to the analog broadcast can be further reduced in comparison with the conventional broadcast reception technique.

Further, according to the broadcast reception technique of the present invention, after a process starts to bring the digital FC closer to the analog FC at time t1, if the S level increases from time t2 as illustrated by a chain line in (C) of FIG. 1, the digital FC is made to increase along with the increase in S level.

In other words, in the broadcast reception technique of the present invention, even if the S level once becomes equal to or lower than the starting threshold THa, still, if the S level becomes higher than, the starting threshold THa before it becomes as low as the level THb, at which the reception status of the digital broadcast starts to worsen, the digital FC is made to increase up to the level of the frequency characteristic (FC) of the digital broadcast as illustrated by a chain line in (D) of FIG. 1.

Hence, according to the broadcast reception technique of the present invention, even after the process starts to bring the digital FC closer to the analog FC, if the possibility that the output is switched soon to the analog broadcast becomes low, the digital FC is not decreased to no avail.

According to the broadcast reception technique of the present invention, when the S level becomes equal to or lower than a predetermined switching threshold THC which is still lower than the starting threshold THa while the digital broadcast is being output, a blending process is performed so as to gradationally switch the output to the analog broadcast.

Then, according to the broadcast reception technique of the present invention, within the period of blending process, the digital FC is controlled so that the frequency characteristic (combined FC) indicating the combined acoustic characteristic of the analog FC of the analog broadcast being output and the digital FC of the digital broadcast being output becomes equal to the analog FC.

Meanwhile, if the S level becomes higher than the predetermined switching threshold THc during the output of analog broadcast, according to the broadcast reception technique of the present invention, a blending process is performed to gradationally switch the output to the digital broadcast.

According to the broadcast reception technique of the present invention, it is possible to maintain the digital FC during the period of blending process, and to increase the digital FC along with the increase in the S level after the blending process ends. The blending process will be described later with reference to FIGS. 4 and 5.

According to the broadcast reception technique of the present invention, the changes in the digital FC are made to follow the changes in the S level mare closely when the S level is decreasing than when the S level is increasing. Hence, according to the broadcast reception technique of the present invention, it is possible to start lowering the digital FC immediately after the S level becomes equal to or lower than the starting threshold THa. The relation between the changes in the digital FC and the changes in the S level will be described later with reference to FIG. 7.

Further, according to the broadcast reception technique according to the present invention, a process to bring the analog FC closer to the digital FC is performed based on the S level of the analog broadcast signal in a similar manner, when the output is switched from the analog broadcast to the digital broadcast.

More specifically, according to the broadcast reception technique of the present invention, if the S level of the analog broadcast signal increases during the output of the analog broadcast, a process is performed to bring the analog FC closer to the digital FC. Hence, according to the broadcast reception technique of the present invention, it is possible to start the process to bring the analog FC closer to the digital FC before the reception status of the digital broadcast starts to recover.

Thus, according to the broadcast reception technique of the present invention, the uncomfortable auditory sensations caused by the output switching can be further reduced because the analog FC is brought closer to the digital FC using a sufficiently long period of time before the output is switched to the digital broadcast.

As described above, according to the broadcast reception technique of the present invention, the acoustic characteristic of the pre-switching broadcast is made closer to the acoustic characteristic of the post-switching broadcast based on the S level of the analog broadcast signal when the output is switched between the digital broadcast and the analog broadcast.

The S level of the analog broadcast signal changes before the reception status of the digital broadcast changes. Therefore, the broadcast reception technique of the present invention can start the control to bring the acoustic characteristic of the pre-switching broadcast closer to the acoustic characteristic of the post-switching broadcast at earlier stage than was possible in the conventional broadcast reception technique.

Thus, according to the broadcast reception technique of the present invention, the acoustic characteristic of the pre-switching broadcast can be brought closer to the acoustic characteristic of the post-switching broadcast using a longer time period than was used in the conventional broadcast reception technique, and hence, the uncomfortable auditory sensation caused by the output switching can be further reduced.

An exemplary embodiment of the broadcast receiving apparatus and a broadcast receiving method to which the broadcast reception technique according to the present invention is applied will be described with reference to FIGS. 2 to 7. Described below as an embodiment is a broadcast receiving apparatus which receives digital broadcast and analog broadcast of the same broadcast contents broadcast based on IBOC system simultaneously, outputs the digital broadcast, and outputs the analog broadcast during a period in which the reception status of the digital broadcast worsens.

Figure 2:
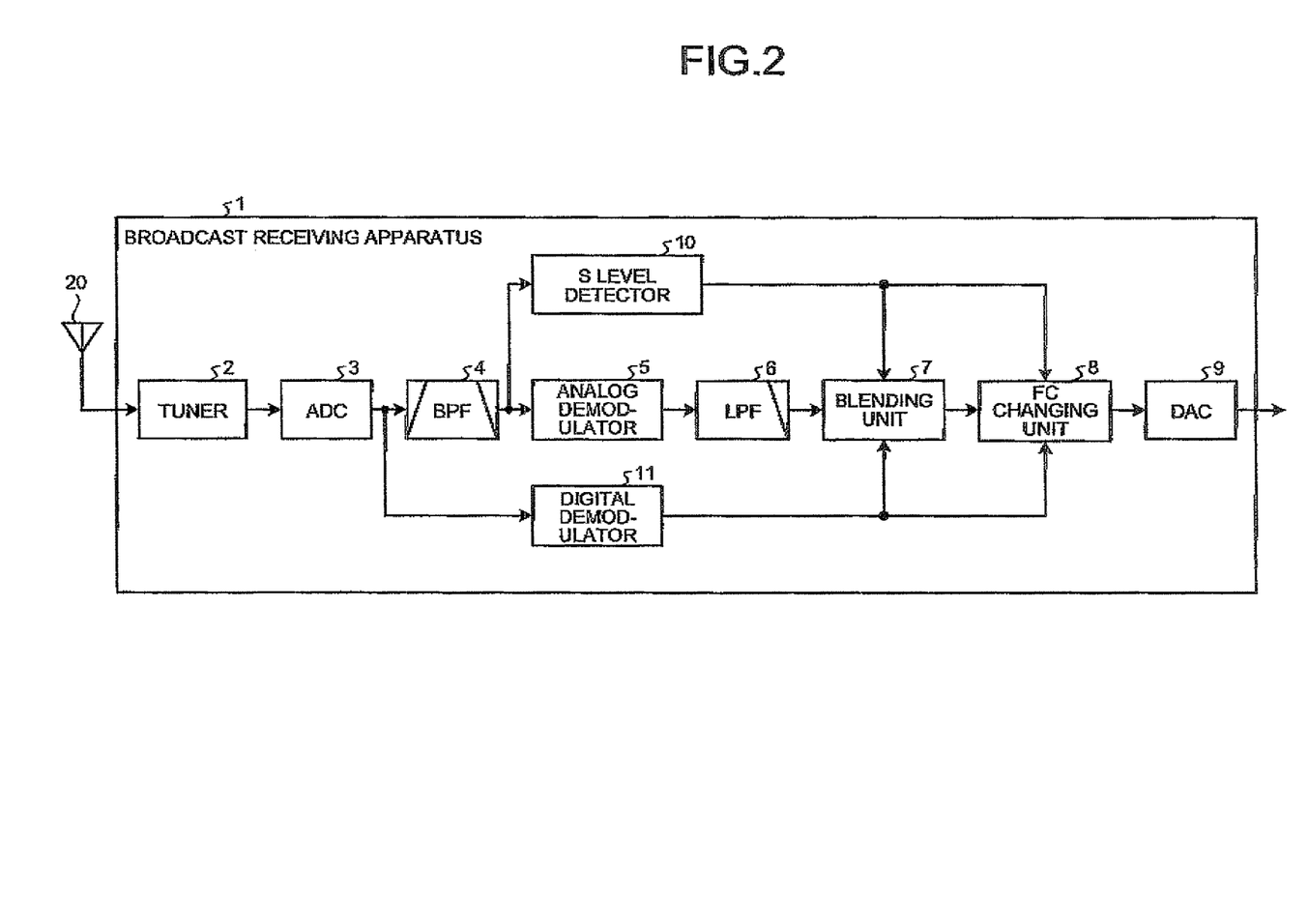
FIG. 2 is a block diagram illustrating a broadcast receiving apparatus according to one embodiment.

FIG. 2 is a block diagram illustrating a broadcast receiving apparatus 1 according to the embodiment. In FIG. 2, only those elements particularly relevant to the features of the broadcast receiving apparatus 1 of the present embodiment are illustrated, and general elements are omitted.

As illustrated in FIG. 2, the broadcast receiving apparatus 1 of the embodiment includes a tuner 2, an analog/digital converter (hereinafter referred to as "ADC") 3, a band-pass filter (hereinafter referred to as "BPF") 4, an analog demodulator 5 and a low-pass filter (hereinafter referred to as "LPF") 6.

Further, the broadcast receiving apparatus 1 includes a blending unit 7, a frequency characteristic changing unit (hereinafter referred to as "FC changing unit") 8, a digital/analog converter (hereinafter referred to as "DAC") 9, a received field strength detector (hereinafter referred to as "S level detector") 10 and a digital demodulator 11.

The tuner 2 is a processor which receives by an antenna 20 the digital broadcast and the analog broadcast of the same broadcast contents broadcast within a predetermined frequency range according to the IBOC system. Specifically, the tuner 2 receives via the antenna 20 broadcast signal which is broadcast at a frequency band of a broadcast channel selected via an operation unit (not shown).

The tuner 2 then acquires a digital broadcast signal employed for digital broadcast and an analog broadcast signal employed for analog broadcast from the received broadcast signal, converts the frequency of the digital broadcast signal and the analog broadcast signal to an intermediate frequency and outputs the result to the ADC 3.

The ADC 3 is a processor which converts the analog, digital broadcast signal and the analog, analog broadcast signal supplied as inputs from the tuner 2 to a digital, digital broadcast signal and digital, analog broadcast signal. The ADC 3 outputs the digital broadcast signal obtained as a result of conversion to the digital demodulator 11, and the analog broadcast signal after conversion to the BPF 4.

The digital demodulator 11 is a processor which demodulates the digital broadcast signal supplied as an input from the ADC 3. The digital demodulator 11 performs OFDM (Orthogonal Frequency-Division Multiplexing) demodulation on the digital broadcast signal which has been subjected to OFDM modulation, and outputs the digital broadcast signal after demodulation to the blending unit 7.

Further, the digital demodulator 11 calculates C/N ratio which indicates the reception status of the digital broadcast signal after the OFDM demodulation, and outputs the result of calculation to the blending unit 7 and the FC changing unit 8.

The BPF 4 is a processor which removes high-frequency components and low-frequency components not used in the analog broadcasting from the analog broadcast signal supplied as an input by the ADC 3, and outputs the signal after removal to the S level detector 10 and the analog demodulator 5.

The S level detector 10 detects the received field strength (hereinafter "S level") of the analog broadcast signal which is supplied as an input by the BPF 4, and outputs the result of detection to the blending unit 7 and the FC changing unit 8. Further, the analog demodulator 5 is a processor which demodulates the analog broadcast signal which has been subjected to frequency modulation or amplitude modulation, and outputs the resulting signal to the LPF 6.

The LPF 6 is a processor which removes high-frequency components serving as noises from the analog broadcast signals supplied as en input by the analog demodulator 5 and outputs the resulting signal to the blending unit 7. The blending unit 7 is a processor which performs a blending process of the digital broadcast signal supplied as an input by the digital demodulator 11 and the analog broadcast signal supplied as an input by the LPF 6 at a predetermined blending ratio and outputs the resulting signal to the FC changing unit 8.

For example, the blending unit 7 amplifies the output level of the digital broadcast signal by a predetermined variant $\alpha$ and amplifies the output level of the analog broadcast signal by $(1-\alpha)$. Then, the blending unit 7 performs the blending process on the digital broadcast signal and the analog broadcast signal after the amplification, and outputs the resulting signal to the FC changing unit 8. Here, $0 \leq \alpha \leq 1$ for variant $\alpha$.

The blending unit 7 outputs only the digital broadcast signal by setting $\alpha=1$, when the C/N ratio of the digital broadcast signal is higher than the set C/N ratio mentioned later, i.e. when the reception status of the digital broadcast is good.

Thereafter, if a predetermined time period elapses after the C/N ratio of the digital broadcast signal becomes equal to or lower than the set C/N ratio while only the digital broadcast signals are output, the blending unit 7 reduces $\alpha$ from 1 to 0 over a predetermined time period, and gradationally switches the output to the analog broadcast.

Further, if the S level supplied as an input by the S level detector 10 increases to become higher than the switching threshold THc mentioned later, during the output of only the analog broadcast signal, the blending unit 7 increases $\alpha$ from 0 to 1 over a predetermined time period, and gradationally switches the output to the digital broadcast.

Thus, according to the present embodiment, the blending unit 7 serves as an output switching unit which switches the output of the broadcast receiving apparatus 1 from the digital broadcast to the analog broadcast and analog broadcast to the digital broadcast.

The FC changing unit 8 is a processor which changes the acoustic characteristic of the digital broadcast signal and/or the analog broadcast signal supplied as an input(s) by the blending unit 7 and outputs the result to the DAC 9.

The FC changing unit 8 is configured as a DSP (digital signal processor), for example, and includes a band-pass filter which changes the frequency range of the digital broadcast signal and the analog broadcast signal, and an acoustic control table which is referred to when the acoustic characteristics of the digital broadcast signal and the analog broadcast signal are changed. The acoustic control table will be described later with reference to FIG. 3.

Here, the "acoustic characteristic" means frequency characteristic that indicates the relation between the frequency and the output level of the digital broadcast signal and analog broadcast signal. Hereinbelow, the acoustic characteristic of the digital broadcast signal is referred to as digital FC, while the acoustic characteristic of the analog broadcast signal is referred to as analog FC. The FC changing unit 8 changes the digital FC and the analog FC by controlling the change of cutoff frequency of the band-pass filter.

The FC changing unit 8 effectively reduces uncomfortable auditory sensations caused when the output is switched to the analog broadcast by starting the process to bring the digital FC closer to the analog FC when the S level supplied as an input by the S level detector 10 becomes equal to or lower than the starting threshold THa while only the digital broadcast signal is being output.

Further, the FC changing unit 8 effectively reduces uncomfortable auditory sensations caused when the output is switched to the digital broadcast by performing the process to bring the analog FC closer to the digital FC when the S level supplied as an input by the S level detector 10 increases while only the analog broadcast signal is being output.

In the present embodiment, the FC changing unit 8 works as an acoustic controlling unit. Procedures for changing the digital FC by the FC changing unit 8 will be described later in detail along with the description of the operation of the broadcast receiving apparatus 1 with reference to FIGS. 4 and 5.

The DAC 9 converts the digital, digital broadcast signal and the digital, analog broadcast signal supplied as an input by the FC changing unit 8 into the analog, digital broadcast signal and analog, analog broadcast signal (analog sound signal) and outputs the resulting signal to the speaker (not shown).

In other words, the broadcast receiving apparatus 1 outputs the sound signal of the digital broadcast while the DAC 9 outputs the digital broadcast signal, whereas the broadcast receiving apparatus 1 outputs the sound signal of the analog broadcast while the DAC 9 outputs the analog broadcast signal.

Figure 3:
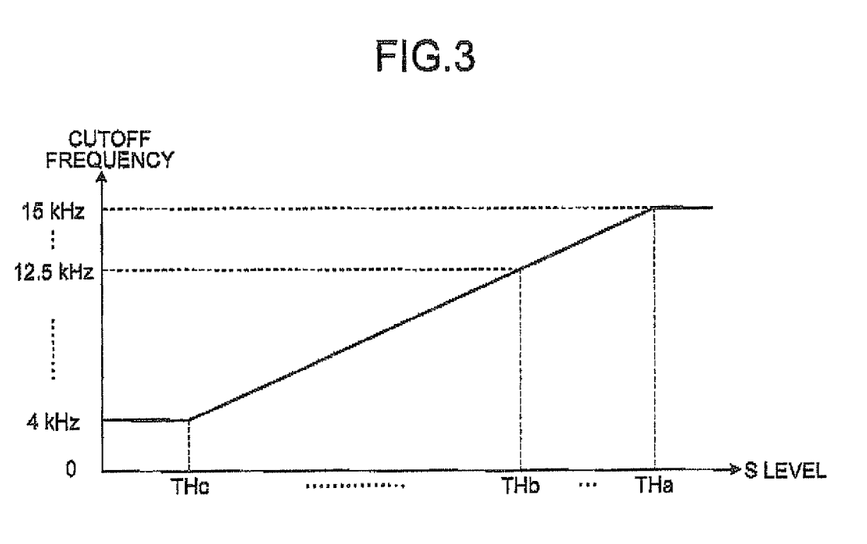
FIG. 3 is a diagram illustrating one example of an acoustic control table provided in the broadcast receiving apparatus according to the present embodiment.

With reference to FIG. 3, the acoustic control table will be described. The acoustic control table is referred to by the FC changing unit 8 when changing the digital FC or the analog FC. FIG. 3 is a diagram illustrating an example of the acoustic control table included in the broadcast receiving apparatus 1 of the present embodiment.

As illustrated in FIG. 3, the acoustic control table stores acoustic characteristic information in which cutoff frequency to be set for the band-pass filter of the FC changing unit 8 is stored in association with each S level of the analog broadcast signal detected by the S level detector 10.

Information to which the FC changing unit 8 refers on changing the digital FC or the analog FC is not limited to the acoustic control table. For example, the FC changing unit 8 may refer to a function indicating the correspondence relation between the S level, of the analog signal and the cutoff frequency to be set for the band-pass filter.

In the present embodiment, the upper limit of the cutoff frequency is set to 15 kHz and the lower limit is set to 4 kHz as an example (see FIG. 3). The upper limit of the sound range of the digital broadcast is assumed to be 15 kHz, and the upper limit of the sound range of the analog broadcast is assumed to be 4 kHz.

In an example illustrated in FIG. 3, the cutoff frequency of 15 kHz is made to correspond to the S level higher than the starting threshold THa, which is the S level at which the FC changing unit 8 is supposed to start lowering the digital FC.

In the present embodiment, the S level of the analog broadcast signal at the beginning of degradation of the reception status of digital broadcast (hereinafter "deg-start S level THb") is calculated in advance through simulation or based on the statistics. S level which is higher than the deg-start S level THb by a predetermined amount is set to be the starting threshold THa.

Further, the cutoff frequency of 4 kHz is made to correspond to the S level which is equal to or lower than the switching threshold THc at which the blending unit 7 is supposed to switch the output from the digital broadcast signal to the analog broadcast signal. In the present embodiment, S level which is lower than the deg-starts S level THb by a predetermined amount is set to the switching threshold THc.

Further, for each S level between the starting threshold THa and the switching threshold THc, a cutoff frequency closer to 15 kHz is assigned to the S level closer to the starting threshold THa, while a cutoff frequency closer to 4 kHz is assigned to the S level closer to the switching threshold THc.

When such an acoustic control table is provided, the FC changing unit 8 sets the digital FC to 15 kHz when the S level supplied as an input by the S level detector 10 is higher than the starting threshold THa, and sets the digital FC to 4 kHz when the S level is equal to or lower than the switching threshold THc. Further, the FC changing unit 8 sets the digital FC to an appropriate level corresponding to the detected changes in the S level while the S level is fluctuating between the starting threshold THa and the switching threshold THc.

Further, the FC changing unit 8 lowers the digital FC for a predetermined time period by a predetermined reduction rate if the C/N ratio of the digital broadcast signal supplied as an input by the digital demodulator 11 becomes equal to or lower than the set C/N ratio during the process to decrease the digital FC.

In the present embodiment, the C/N ratio of the digital broadcast signal when the S level of the analog broadcast signal becomes equal to or lower than the deg-start S level THb is calculated in advance. The calculated C/N ratio is set as the set C/N ratio.

Thereafter, the blending unit 7 starts the blending process to switch the output from the digital broadcast signal to the analog broadcast signal. The FC changing unit 8 reduces the cutoff frequency of the band-pass filter to 4 kHz within a predetermined time period (for example, 400 msec) from the start to the end of the blending process if the cutoff frequency of the band-pass filter has not been decreased to 4 kHz.

Figure 4:
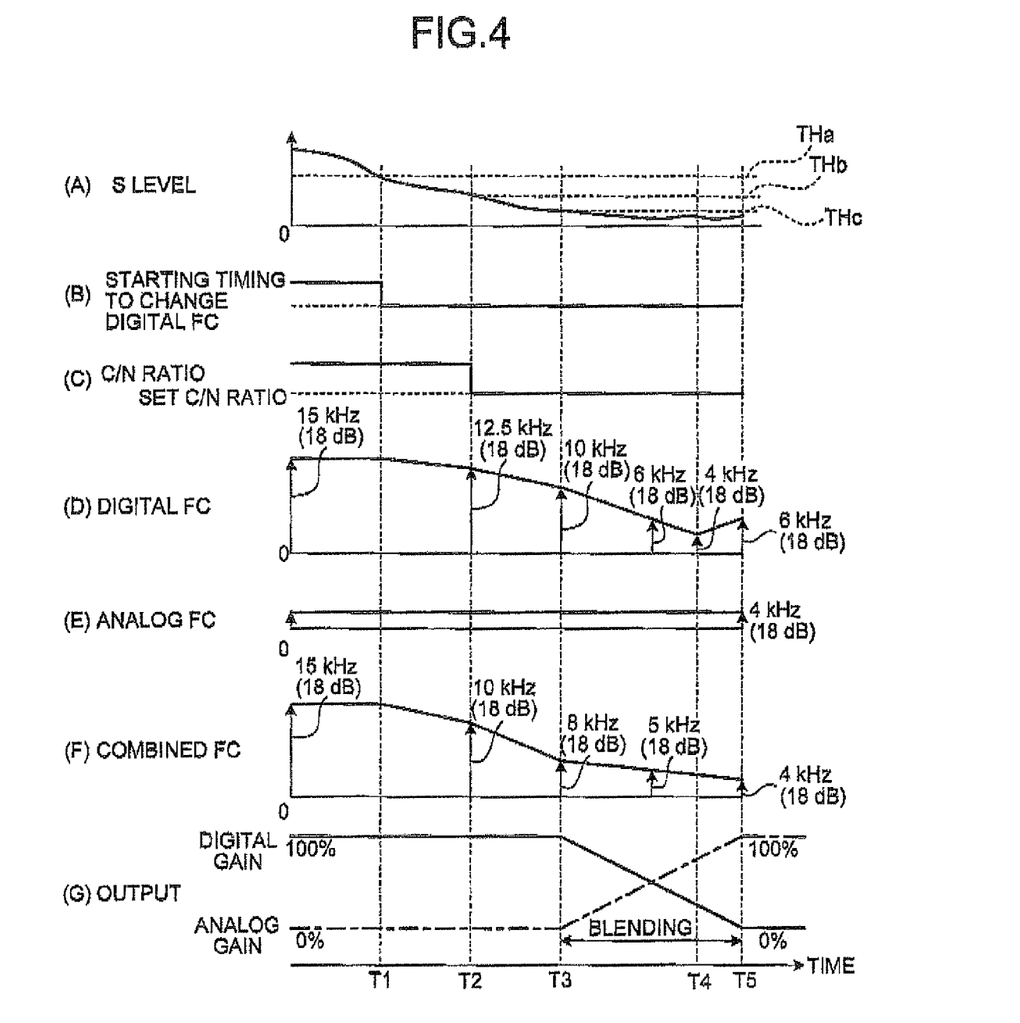
FIG. 4 is a diagram illustrating an output switching operation performed by the broadcast receiving apparatus of the present embodiment.
Figure 5:
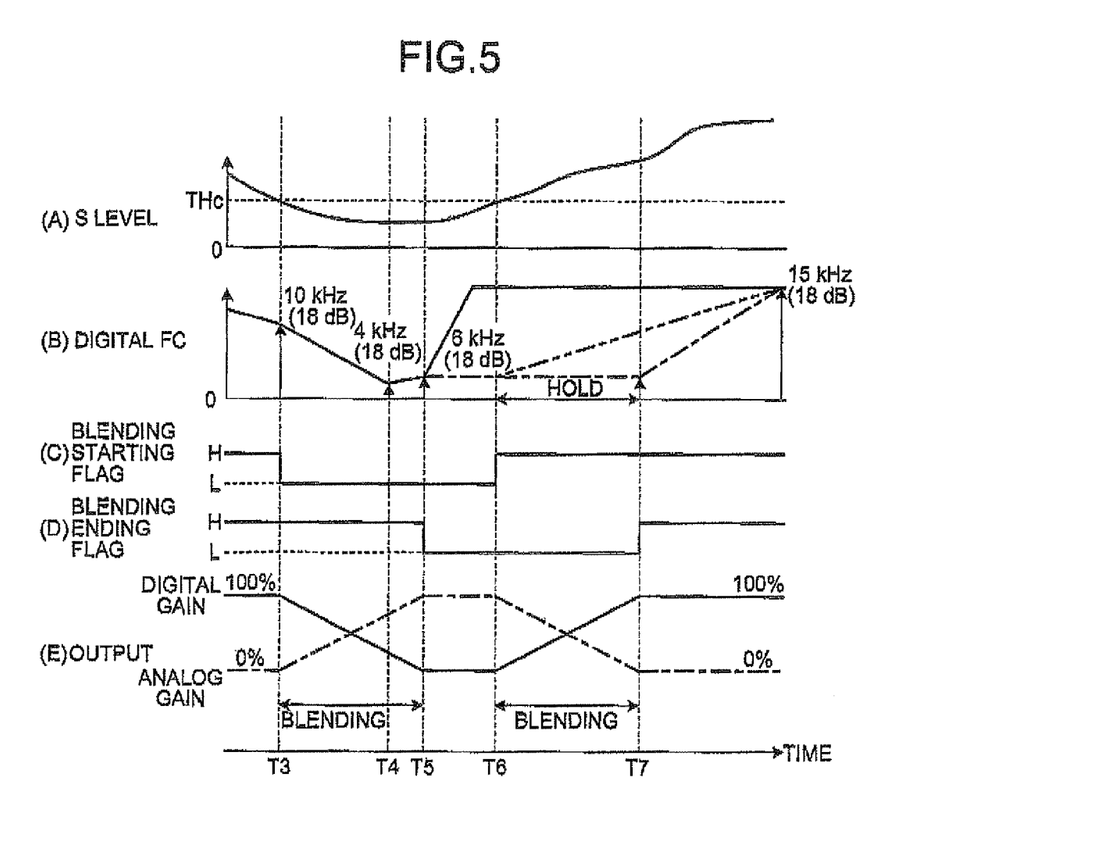
FIG. 5 is another diagram illustrating an output switching operation performed by the broadcast receiving apparatus of the present embodiment.

Operations performed by the broadcast receiving apparatus 1 to switch the output between the analog broadcast and the digital broadcast will be described with reference to FIGS. 4 and 5. FIGS. 4 and 5 are diagrams illustrating the output switching operation performed by the broadcast receiving apparatus 1 according to the present embodiment.

In the following, the operation performed by the broadcast receiving apparatus 1 to switch the output from the digital broadcast to the analog broadcast will be described first with reference to FIG. 4, and then the operation performed by the broadcast receiving apparatus 1 to switch the output from the analog broadcast to the digital broadcast will be described with reference to FIG. 5.

In FIG. 4, (A) illustrates the changes in the S level of the analog broadcast signal detected by the S level detector 10. On the other hand, (B) in FIG. 4 illustrates the timing the FC changing unit 8 starts changing the digital FC.

Further, (C) of FIG. 4 illustrates the changes in C/N ratio of the digital broadcast signal calculated by the digital demodulator 11, and (D) of FIG. 4 illustrates the changes in the digital FC caused by the FC changing unit 8.

In the present embodiment, the FC changing unit 8 changes the digital FC by changing the cutoff frequency of the band-pass filter while adjusting the output level so that the output of the digital broadcast signal is maintained at 18 dB as illustrated in (D) of FIG. 4.

In FIG. 4, (E) illustrates the analog FC of the analog broadcast signal supplied as an output by the FC changing unit 8. As illustrated in (E) of FIG. 4, in the present embodiment, the FC changing unit 8 maintains the analog FC (cutoff frequency of the analog broadcast signal) to 4 kHz and the output to 18 dB constantly.

In FIG. 4, (F) illustrates the changes in the combined acoustic characteristic (hereinafter "combined FC") of the digital FC and the analog FC as changed by the FC changing unit 8. Further, (G) of FIG. 4 illustrates the changes in each output level of the digital broadcast signal and the analog broadcast signal supplied as output by the blending unit 7.

In the broadcast receiving apparatus 1, the FC changing unit 8 sets the digital FC to 15 kHz which is a FC for digital broadcasting as illustrated in (D) of FIG. 4 when the S level detected by the S level detector 10 during the output of the digital broadcast is higher than the starting threshold THa as illustrated in (A) of FIG. 4.

Further, in the broadcast receiving apparatus 1, the FC changing unit B determines that the time T1 is the timing to start changing the digital FC as illustrated in (B) of FIG. 4 if the S level becomes equal to or lower than the starting threshold THa at the time T1 during the output of the digital broadcast as illustrated in (A) of FIG. 4.

Then, on determining that the time T1 is the timing to start changing the digital FC, the FC changing unit 8 starts a process to bring the digital FC closer to the analog FC by lowering the digital FC from time T1 as illustrated in (D) of FIG. 4

The FC changing unit 8 sequentially sets the cutoff frequency assigned to the S level detected by the S level detector 10 to the band-pass filter of the FC changing unit 8 based on the acoustic control table.

Assume that, thereafter the S level detected by the S level detector 10 becomes equal to or lower than the deg-start S level THb at the time T2 as illustrated in (A) of FIG. 4, and the C/N ratio of the digital broadcast signal becomes equal to or lower than the set C/N ratio previously set as illustrated in (C) of FIG. 4.

When the C/N ratio of the digital broadcast signal becomes equal to or lower than the set C/N ratio, the FC changing unit 8 lowers the digital FC by a predetermined reduction rate over a predetermined time from time T2 to time T3 as illustrated in (D) of FIG. 4.

The time period during which the FC changing unit 8 keeps lowering the digital FC by the predetermined reduction rate is calculated in advance based on a simulation of the time required after the C/N ratio of the digital broadcast signal becomes equal to or lower than the set C/N ratio until the S level becomes equal to or lower than the switching threshold THc.

When the C/N ratio becomes equal to or lower than the set C/N ratio, the blending unit 7 causes a timer to start in order to invert a blending starting flag at time T3 which is a predetermined time after the time T2 at which the C/N ratio becomes equal to or lower than the set C/N ratio.

Thereafter, if the blending starting flag is inverted at time T3, the blending unit 7 starts the blending process of the outputs by reducing the output level of the digital broadcast signal (digital gain) and raising the output level of the analog broadcast signal (analog gain) as illustrated in (G) of FIG. 4.

The blending unit 7 causes a timer to start to invert the blending ending flag at the time T5 which is a predetermined time (e.g., 400 msec) after the time T3 at which the blending starts. Then, the blending unit 7 continues to perform the blending process of the output until the blending ending flag is inverted and thereby gradationally switching the output from the digital broadcast signal to the analog broadcast signal.

Thus, the broadcast receiving apparatus 1 starts the process to bring the digital FC closer to the analog FC when the S level of the analog broadcast signal becomes equal to or lower than the predetermined starting threshold THa, before the C/N ratio of the digital broadcast signal becomes equal to or lower than the set C/N ratio during the output of the digital broadcast.

In other words, the broadcast receiving apparatus 1 can start the process to bring the digital FC closer to the analog FC before the reception status of the digital broadcast output starts deteriorating. Hence, the broadcast receiving apparatus 1 can spare a longer time for bringing the digital FC closer to the analog FC in comparison with the conventional broadcast reception technique, and thus, the uncomfortable auditory sensations caused by switching the output to the analog broadcast can be further reduced.

Further, the FC changing unit 8 controls the digital FC so as to bring the combined FC closer to the analog FC while the blending unit 7 performs the blending process to gradationally switch the output from digital broadcast signal to the analog broadcast signal. For example, the FC changing unit 8 lowers the digital PC to the analog FC of 4 kHz once during the time period of T3 to T4 as illustrated in (D) of FIG. 4.

Thereafter, the FC changing unit 8 raises the digital FC up to 6 kHz during the time period of T4 to T5 and thus brings the combined FC closer to the analog FC of 4 kHz as illustrated in (F) of FIG. 4.

Operations performed by the broadcast receiving apparatus 1 to switch the output from the analog broadcast to the digital broadcast will be described with reference to FIG. 5. The S level (A), digital FC (B), output (E) during the time period T3 to T5 illustrated in FIG. 5 change in a similar manner to the change in S level (A), digital FC (D) acid output (G) during the time period T3 to T5 illustrated in FIG. 4.

Therefore, an operation of the broadcast receiving apparatus 1 after the time T5 will be described. As illustrated in (B) of FIG. 5, in the broadcast receiving apparatus 1, the FC changing unit 8 raises (recovers) the digital FC from 6 kHz to 15 kHz which is the FC for digital broadcasting, once the switching of the output from the digital broadcast to the analog broadcast completes at time T5.

As illustrated in (E) of FIG. 5, the digital gain is 0 percent. Hence, there is no uncomfortable auditory sensation to the users even if the digital FC is suddenly raised from 6 kHz to 15 kHz.

Thereafter, as illustrated in (A) of FIG. 5, the S level of the analog broadcast signal detected by the S level detector 10 increases and exceeds the switching threshold THc at the time T6. Then, in the blending unit 7, the blending starting flag is inverted as illustrated in (C) of FIG. 5.

The FC changing unit 8 performs the process to bring the analog FC closer to the digital FC according to the rise in S level when the S level of the analog broadcast signal detected by the S level detector 10 starts to rise (not shown).

When the blending starting flag is inverted, the blending unit 7 reduces the analog gain and increases the digital gain during the time period T6 to T7 as illustrated in (E) of FIG. 5 to gradationally switch the output to the digital broadcast signal.

Here, the FC changing unit 8 starts the process to bring the analog FC closer to the digital FC before the level starts rising and reaches the switching threshold THc. Alternatively, the FC changing unit 8 may start the process to bring the analog FC closer to the digital FC when the S level reaches the switching threshold THc.

Thus, the FC changing unit 8 performs the process to bring the analog FC closer to the digital FC when the output is switched from the analog broadcast to the digital broadcast. Therefore, the uncomfortable auditory sensations caused by the switching of the output from the analog broadcast to the digital broadcast can be reduced.

Further, in the broadcast receiving apparatus 1, the FC changing unit 8 raises the digital FC up to the FC for the digital broadcasting, before the output switching from the analog broadcast to the digital broadcast starts. Hence, the blending process by the blending unit 7 is not performed in parallel with the process to increase the digital FC. Thus, the broadcast receiving apparatus 1 can reduce the processing amount for switching from the analog broadcast to the digital broadcast.

It is not necessary to raise the digital FC immediately after the output is switched from the digital broadcast to the analog broadcast. For example, the digital FC may be raised after the output is switched from the analog broadcast to the digital broadcast.

Specifically, the FC changing unit 8 may maintain the digital FC at 6 kHz after the output is switched to the analog broadcast signal at time T5 until the output is switched to the digital broadcast signal at time T7, and raise the digital FC from time T7 as indicated by a chain line in (B) of FIG. 5.

In this case, the broadcast receiving apparatus 1 does not perform the blending process by the blending unit 7 in parallel with the process to raise the digital FC. Hence, the processing amount for switching from the analog broadcast to the digital broadcast can be reduced.

The FC changing unit 8 may maintain the digital FC to 6 kHz during the time period from T5 to T6 and start raising the digital FC according to the rise in the S level at the time the blending process for switching the analog broadcast to the digital broadcast is started.

When the digital FC is raised in the above manner, the FC changing unit 8 can raise the digital FC following the rise in digital gain and S level. Therefore, the uncomfortable auditory sensations caused by the switching from the analog broadcast to the digital broadcast can be effectively reduced.

Figure 6:
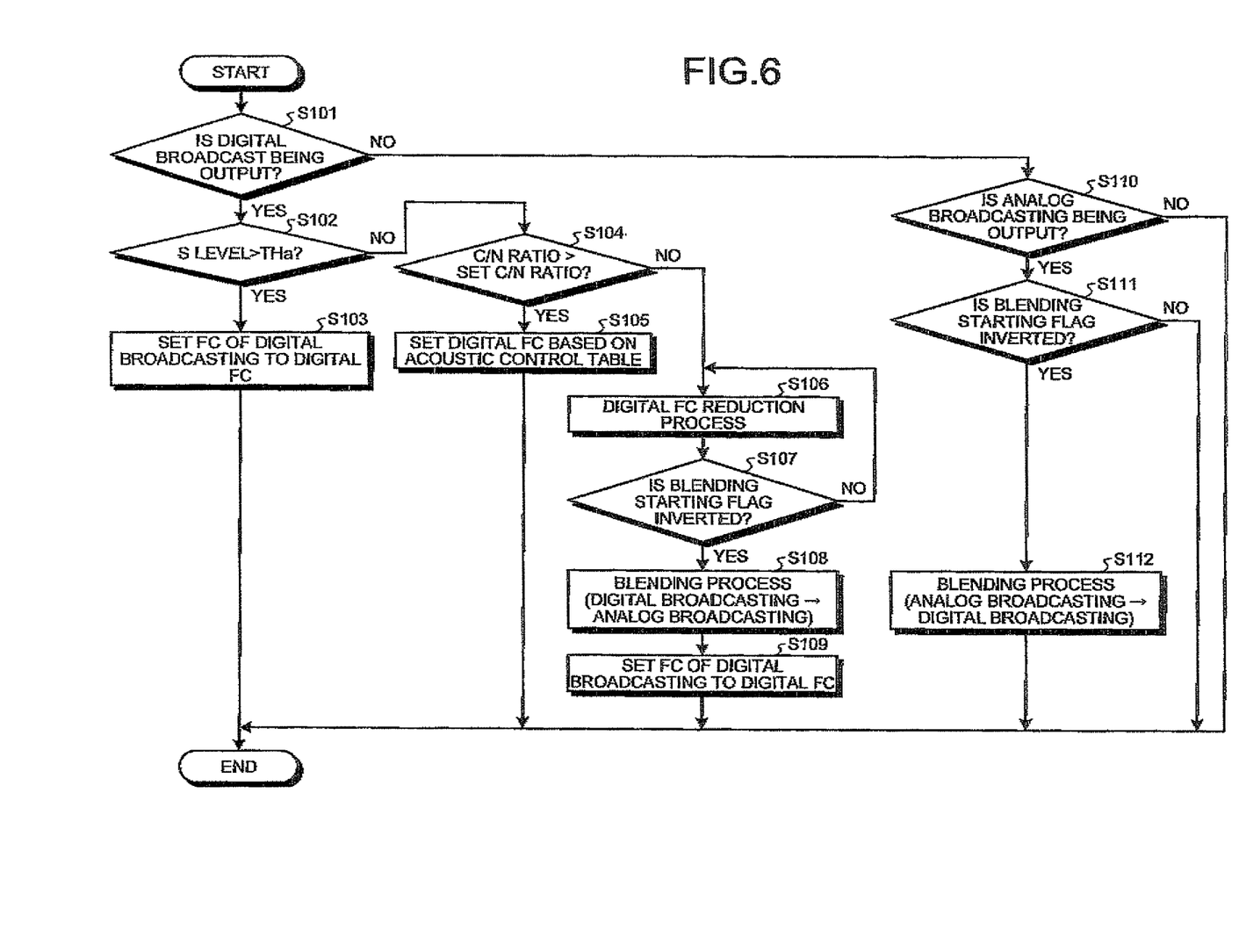
FIG. 6 is a flowchart illustrating a process performed by the broadcast receiving apparatus according to the present embodiment.

Process performed by the broadcast receiving apparatus 1 will be described with reference to FIG. 6. FIG. 6 is a flowchart illustrating the process performed by the broadcast receiving apparatus 1 according to the embodiment.

As illustrated in FIG. 6, when power is turned on, the broadcast receiving apparatus 1 determines whether the digital broadcast is being output or not (step S101). On determining that the digital broadcast is being output (Yes in step S101), the broadcast receiving apparatus 1 determines whether the S level of the analog broadcast signal is higher than the starting threshold THa or not (step S102).

On determining that the S level is higher than the starting threshold THa (Yes in step S102), the broadcast receiving apparatus 1 sets the digital FC to the FC for digital broadcasting (step S103) and ends the process.

On the other hand, on determining that the S level is equal to or lower than the starting threshold THa (No in step S102), the broadcast receiving apparatus 1 determines whether the C/N ratio of the digital broadcast signal is higher than the set C/N ratio or not (step S104).

On determining that the C/N ratio is higher than the set C/N ratio (Yes in step S104), the broadcast receiving apparatus 1 sets the level associated with the S level of the analog broadcast signal to the digital FC based on the acoustic control table (step S105) and ends the process.

On the other hand, on determining that the C/N ratio is equal to or lower than the set C/N ratio (No in step S104), the broadcast receiving apparatus 1 performs the digital FC reduction process to lower the digital FC for a predetermined period of time by a predetermined reduction rate (step S106).

Subsequently, the broadcast receiving apparatus 1 determines whether the blending starting flag is inverted or not (step S107). On determining that the blending starting flag is inverted (Yes in step S107), the broadcast receiving apparatus 1 performs a blending process to switch the output from the digital broadcast to the analog broadcast (step S108).

During the blending process, the broadcast receiving apparatus 1 controls the digital FC so that the combined FC of the digital PC and the analog FC comes closer to the analog FC. After the blending process (step S108) is completed, the broadcast receiving apparatus 1 raises the digital FC to the FC for digital broadcasting (step S109) and ends the process.

On the other hand, on determining that the blending starting flag is not inverted (No in step S107), the broadcast receiving apparatus 1 repeatedly performs the digital FC reduction process until the blending starting flag is inverted.

Further, on determining that the digital broadcast is not being output in step S101 (No in step S101), the broadcast receiving apparatus 1 determines whether the analog broadcast is being output or not (step S110). On determining that the analog broadcast is not being output (No in step S110), the broadcast receiving apparatus 1 ends the process.

On the other hand, on determining that the analog broadcast is being output (Yes in step S110), the broadcast receiving apparatus 1 determines that the blending starting flag is inverted or not (step S111). Here, on determining that the blending starting flag is not inverted (No in step S111), the broadcast receiving apparatus 1 ends the process.

On determining that the blending starting flag is inverted (Yes in step S111), the broadcast receiving apparatus 1 performs the blending process to switch the output from the analog broadcast to the digital broadcast (step S112) and ends the process. The broadcast receiving apparatus 1 repeats the process illustrated in FIG. 6 while the power is on.

In FIG. 6, the digital FC is raised to the FC for the digital broadcasting immediately after the output is switched from the digital broadcast to the analog broadcast. However, the digital FC may be maintained (i.e., held) until the blending process for switching the output from analog broadcast to digital broadcast completes.

The digital FC may be raised to the FC for digital broadcasting after the blending process for switching the output from analog broadcast to digital broadcast ends.

Alternatively, the digital FC may be maintained until the blending process for switching the output from analog broadcast to digital broadcast starts, and the digital FC may be raised to the FC for digital broadcasting following the rise in the S level of the analog broadcast signal from the time the blending process starts.

In the broadcast receiving apparatus 1, when the digital FC is changed, the FC changing unit 8 can make the changes in the digital FC follow the changes in S level more closely during the falling period of S level than during the rising period of S level.

Figure 7:
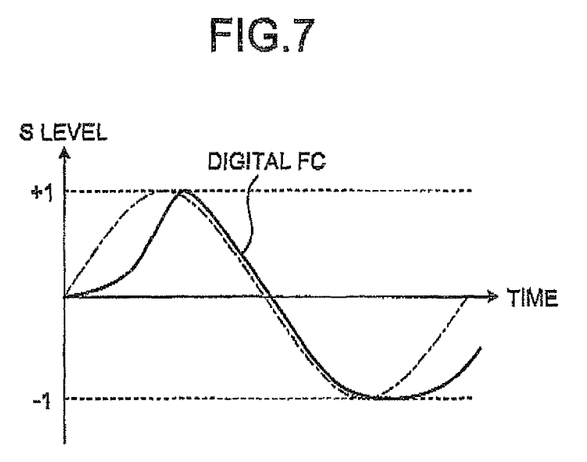
FIG. 7 is a diagram illustrating an example of operations performed by the broadcast receiving apparatus of the present embodiment to change digital FC along with the change in S level.

Described with reference to FIG. 7 is an example of the operation performed by the FC changing unit 8 to change the digital FC following the changes in S level of the analog broadcast signal.

FIG. 7 is a diagram illustrating an example of the operation performed by the broadcast receiving apparatus 1 according to the present embodiment to change the digital FC following the changes in S level. In FIG. 7, the increase-decrease range of the S level is converted into the range of ±1, and the change of S level is indicated by chain line, while the change in digital FC is indicated by solid line.

As illustrated in FIG. 7, when the digital FC is changed, the FC changing unit 8 of the broadcast receiving apparatus 1 can make the changes in the digital FC follow the change in S level of analog broadcast signal more closely when the S level is decreasing than when the S level is increasing. In other words, the FC changing unit 8 reduces the digital FC substantially at the same time with the decrease in S level within the falling period of the S level.

Hence, the FC changing unit 8 can spend sufficient time for the process to bring the digital FC closer to the analog FC by starting this process substantially at the same time with the time when the S level lowers to reach the starting threshold THa. Thus, the broadcast receiving apparatus 1 can effectively reduce the uncomfortable auditory sensations caused by the output switching from the digital broadcast to the analog broadcast.

On the other hand, the FC changing unit 8 can make the digital FC increase smoothly up to the FC for digital broadcasting spending a longer time than the time required for the S level to rise up to reach the upper limit during the period in which the S level is increasing.

Hence, the broadcast receiving apparatus 1 can effectively reduce the uncomfortable auditory sensations caused by the output switching from analog broadcast to digital broadcast.

In the present embodiment, the FC changing unit 8 lowers the digital FC at a predetermined reduction rate over a predetermined time period after the C/N ratio of the digital broadcast signal becomes equal to or lower than the set C/N ratio. However, the manner of lowering the digital FC is not limited thereto.

For example, the FC changing unit 8 may lower the digital FC based on the acoustic control table illustrated in FIG. 3 after the S level detected by the S level detector 10 becomes equal to or lower than the starting threshold THa and before it becomes equal to or lower than the switching threshold THc.

When such a configuration is adapted, the blending unit 7 starts the blending process for gradationally switching the output from the digital broadcast signal to the analog broadcast signal when the S level detected by the S level detector 10 becomes equal to or lower than the switching threshold THc. The FC changing unit 8 lowers the digital FC to the level of analog FC before the blending process ends.

With such configuration, the FC changing unit 8 does not need to monitor the C/N ratio of the digital broadcast signal for performing the digital FC lowering process. Thus, the processing load of the FC changing unit 8 can be reduced.

As described above, the broadcast receiving apparatus according to the present embodiment brings the acoustic characteristic of pre-switching broadcast to the acoustic characteristic of post-switching broadcast based on the S level of the analog broadcast signal when switching the output between the digital broadcast and the analog broadcast.

The S level of the analog broadcast signal changes prior to the changes in the reception status of digital broadcast. Hence, in the broadcast receiving apparatus according to the present embodiment, the control for bringing the acoustic characteristic of pre-switching broadcast closer to the acoustic characteristic of post-switching broadcast can be started earlier than was performed in the conventional broadcast reception technique.

Thus, according to the broadcast receiving apparatus of the present embodiment, the acoustic characteristic of the pre-switching broadcast can be brought closer to the acoustic characteristic of the post-switching broadcast using a longer time period than was used in the conventional broadcast reception technique. Hence, uncomfortable auditory sensations caused at the output switching can be further reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A broadcast receiving apparatus comprising:
a receiving unit that receives digital broadcast and analog broadcast including same broadcast contents simultaneously;
an output switching unit that outputs the digital broadcast received by the receiving unit and outputs the analog broadcast during a time period over which a reception status of the digital broadcast worsens;
a detecting unit that detects a received field strength of analog broadcast signals employed in the analog broadcast; and
an acoustic controlling unit that performs control to bring an acoustic characteristic of a pre-switching broadcast closer to an acoustic characteristic of a post-switching broadcast based on the received field strength detected by the detecting unit when an output is switched between the digital broadcast and the analog broadcast,
wherein, if the received field strength becomes lower than a predetermined starting threshold or if the received field strength becomes higher than the predetermined starting threshold prior to becoming as low as a predefined level where the reception status starts to worsen, a frequency characteristic of a digital broadcast signal is increased to a level of a frequency characteristic of the digital broadcast.

2. The broadcast receiving apparatus according to claim 1, wherein
the acoustic controlling unit starts the control to bring the acoustic characteristic of the digital broadcast being output closer to the acoustic characteristic of the analog broadcast when the received field strength detected by the detecting unit during output of the digital broadcast becomes equal to or lower than the predetermined starting threshold.

3. The broadcast receiving apparatus according to claim 1, wherein
the output switching unit gradationally switches the output to the analog broadcast by decreasing the output level of the digital broadcast and increasing the output level of the analog broadcast when the received field strength detected by the detecting unit becomes equal to or lower than a predetermined switching threshold which is lower than the starting threshold, and
the acoustic controlling unit controls the acoustic characteristic of digital broadcast which is being output so that a combined acoustic characteristic of the acoustic characteristic of the output analog broadcast and the acoustic characteristic of the output digital broadcast is brought closer to the acoustic characteristic of the analog broadcast during a period in which the output switching unit gradationally switches the output to the analog broadcast.

4. The broadcast receiving apparatus according to claim 1, wherein
the output switching unit gradationally switches the output to the digital broadcast by decreasing the output level of the analog broadcast and increasing the output level of the digital broadcast when the received field strength detected by the detecting unit during the output of the analog broadcast becomes higher than the switching threshold, and
the acoustic controlling unit maintains the acoustic characteristic of the output digital broadcast during a period in which the output switching unit gradationally switches the output to the digital broadcast, and changes the acoustic characteristic according to the received field strength detected by the detecting unit after the output switching to the digital broadcast is completed.

5. The broadcast receiving apparatus according to claim 1, wherein
the acoustic controlling unit controls the acoustic characteristic of the digital broadcast to make the change in the acoustic characteristic follow the change in the received field strength more closely during a period when the received field strength detected by the detecting unit decreases than in a period when the received field strength detected by the detecting unit increases.

6. The broadcast receiving apparatus according to claim 1, further comprising
an acoustic-characteristic-information storing unit that stores acoustic-characteristic information associating the received field strength detected by the detecting unit and the acoustic characteristic of the digital broadcast to be set by the acoustic controlling unit when the associated received field strength is detected,
wherein the acoustic controlling unit sets the acoustic characteristic of the digital broadcast based on the acoustic-characteristic information stored in the acoustic-characteristic-information storing unit when the received field strength detected by the detecting unit during the output of the digital broadcast is equal to or lower than the starting threshold and a carrier-to-noise ratio with respect to broadcast signals of the digital broadcast is higher than a previously set value.

7. The broadcast receiving apparatus according to claim 1, wherein the acoustic controlling unit performs control to bring the acoustic characteristic of the output digital broadcast closer to the acoustic characteristic of the digital broadcast when the received field strength detected by the detecting unit rises after the control to bring the acoustic characteristic closer to the acoustic characteristic of the analog broadcast starts.

8. The broadcast receiving apparatus according to claim 1, wherein the acoustic controlling unit performs control to bring the acoustic characteristic of the output analog broadcast closer to the acoustic characteristic of the digital broadcast when the received field strength detected by the detecting unit during the output of the analog broadcast increases.

9. A broadcast receiving method comprising:

receiving digital broadcast and analog broadcast including same broadcast contents simultaneously;

outputting the digital broadcast received in the receiving and outputting the analog broadcast during a time period over which a reception status of the digital broadcast worsens;

detecting a received field strength of analog broadcast signals employed in the analog broadcast; and performing a control to bring an acoustic characteristic of a pre-switching broadcast closer to an acoustic characteristic of a post-switching broadcast based on the received field strength detected in the detecting when an output is switched between the digital broadcast and the analog broadcast, wherein, if the received field strength becomes lower than a predetermined starting threshold or if the received field strength becomes higher than the predetermined starting threshold prior to becoming as low as a predefined level where the reception status starts to worsen, a frequency characteristic of a digital broadcast signal is increased to a level of a frequency characteristic of the digital broadcast.

10. A broadcast receiving apparatus comprising:

a receiving unit that receives digital broadcast and analog broadcast including same broadcast contents simultaneously;

an output switching unit that outputs the digital broadcast received by the receiving unit and outputs the analog broadcast during a time period over which a reception status of the digital broadcast worsens;

a detecting unit that detects a received field strength of analog broadcast signals employed in the analog broadcast; and an acoustic controlling unit that performs control to bring an acoustic characteristic of a pre-switching broadcast closer to an acoustic characteristic of a post-switching broadcast based on the received field strength detected by the detecting unit when an output is switched between the digital broadcast and the analog broadcast, wherein the acoustic controlling unit further performs at least one of:

controlling the acoustic characteristic of the digital broadcast to make the change in the acoustic characteristic follow the change in the received field strength more closely during a period when the received field strength detected by the detecting unit decreases than in a period when the received field strength detected by the detecting unit increases, bringing the acoustic characteristic of the output digital broadcast closer to the acoustic characteristic of the digital broadcast when the received field strength detected by the detecting unit rises after the control to bring the acoustic characteristic closer to the acoustic characteristic of the analog broadcast starts, or bringing the acoustic characteristic of the output analog broadcast closer to the acoustic characteristic of the digital broadcast when the received field strength detected by the detecting unit during the output of the analog broadcast increases.

\* \* \* \* \*